Figure 1:
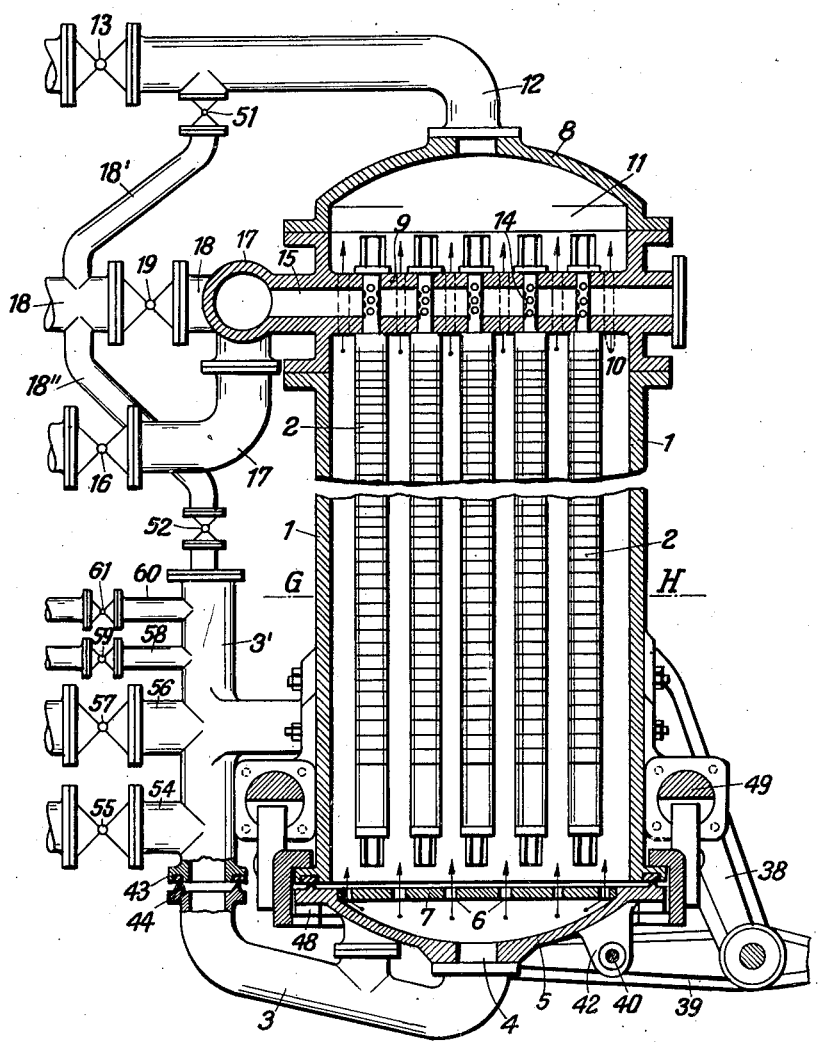

July 29, 1930.  H. JUNG  1,771,928
FILTER PRESS
Filed Dec. 1, 1928   4 Sheets-Sheet 1

Inventor:
Hans Jung
by Richard E. Babcock
Attorney

Inventor:
Hans Jung
by Richard L. Babcock
Attorney

July 29, 1930.　　　　　　H. JUNG　　　　　　1,771,928

FILTER PRESS

Filed Dec. 1, 1928　　　4 Sheets-Sheet 3

Inventor:
Hans Jung
by Richard E. Babcock
Attorney

July 29, 1930.  H. JUNG  1,771,928
FILTER PRESS
Filed Dec. 1, 1928  4 Sheets-Sheet 4

Inventor:
Hans Jung
by Richard E. Babcock
Attorney

Patented July 29, 1930

1,771,928

UNITED STATES PATENT OFFICE

HANS JUNG, OF STASSFURT, GERMANY

FILTER PRESS

Application filed December 1, 1928, Serial No. 323,065, and in Germany May 2, 1927.

The invention relates to improvements in filter presses and their mode of operation, and more particularly to that type of filter presses in which a large number of porous tubular filter flasks are suspended within a vertical pressure cylinder. The liquid to be filtered and holding sludge or other matter in suspension (raw liquid) percolates through the filter walls from the outside to the inside and the clear liquid escapes at the open end through a pipeline while the solid matter adhering to the outside of the filter flasks or tubes is periodically thrown off by compressed air passing through the flasks from the inside to the outside and removed from the cylinder or receptacle.

The filter presses with vertical filter tubes or flasks used up to now have owing to their construction and mode of operation certain drawbacks viz. the cake formed on the filter flasks is not of uniform thickness, and cakes of comparatively considerable thickness drop off prematurely in parts, while others are not thrown off by the compressed air. My invention effectively eliminates the just recited drawbacks and by the aid of a preferably ascending flow of liquid sweeping uniformly along the filter tubes permits the formation of cakes of uniform thickness, which are only thrown off the tubes, when they have reached a thickness of about ½ to 1 inch after blowing off the raw liquid contained in the cylinder and opening the bottom cover, in the form of shells or peels with a low content of humidity. When the surface of the tubes is washed they are likewise swept uniformly from all sides. The improved filter press according to my invention is intended for filtration on a large scale and to purify large quantities of liquid containing a high percentage of solid matter in suspension, or to collect and recover the solid admixtures, which are periodically ejected from the press.

The embodiment of my invention is illustrated in the accompanying drawings by way of example. In the drawings, Fig. 1, a vertical section through my improved filter press in the direction of the upper transverse channels along line A—B of Fig. 3.

Figure 2:
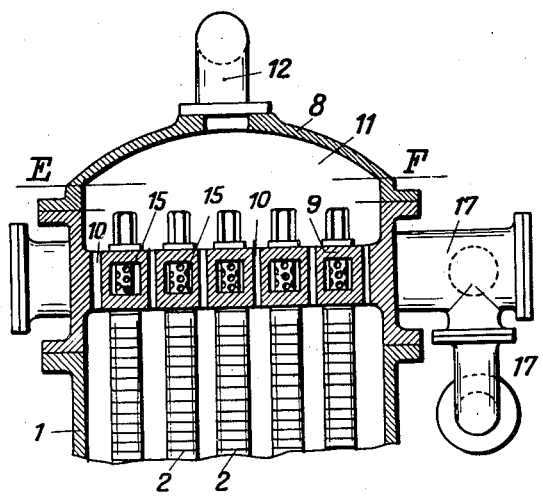
Figure 3:
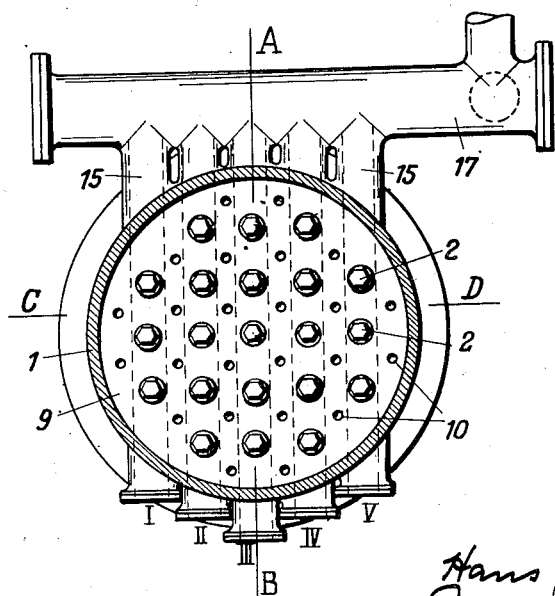

Fig. 2, a section at right angles to the section according to Fig. 1 of the upper part of the press along line C—D of Fig. 3.

Fig. 3, a horizontal section through the press above the intermediate wall 9 along line E—F of Fig. 2.

Figure 4:
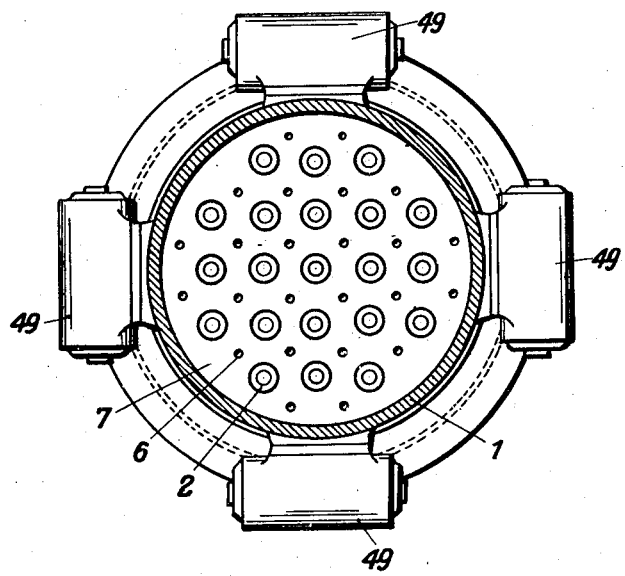

Fig. 4, a horizontal section through the press at medium height along line G—H of Fig. 1.

Figure 5:
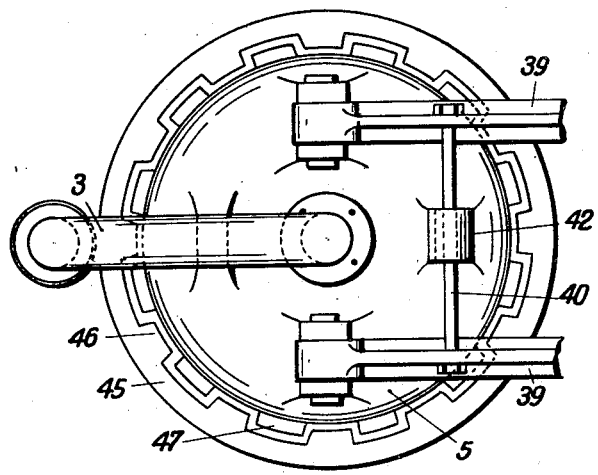

Fig. 5, a bottom view of the press or its bottom 5 adapted to be folded downwards.

Figure 6:
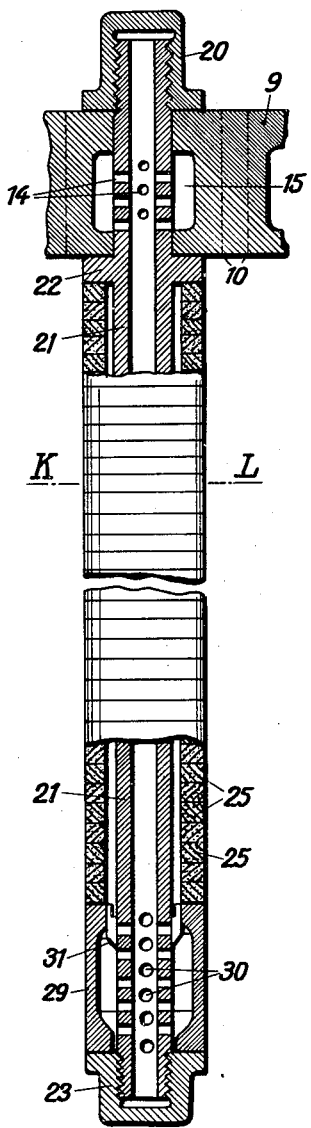

Fig. 6, a longitudinal section through a simple filter tube or flask.

Figure 7:
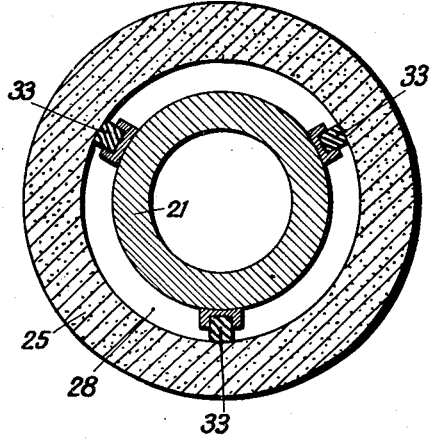

Fig. 7, a cross section through a filter tube along line K—L of Fig. 6, and

Figure 8:
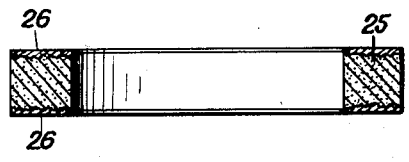

Fig. 8, a longitudinal section through a filter ring.

The filter press consists substantially of a vertical cylinder, tank or receptacle 1 of, for instance, 7 to 10 feet height and 5 feet diameter in the interior of which are suspended a large number, say 60, filter tubes or filter flasks closed at the lower free ends of about 6½ feet length and 5 inches outer diameter. According to my invention the raw liquid is conducted parallel to the filter tubes 2, enters the cylinder 1 through a bend 3 from an axial opening 4 of the tapering bottom 5 and is uniformly distributed over the entire cylinder area by the distributing plate 7 provided with perforations 6.

The filter tubes or flasks 2 are at their upper ends mounted on an intermediate wall 9 underneath the cover 8. This wall 9 is provided with passage openings 10 for the raw liquid, which enable a uniformly distributed flow of the raw liquid parallel to the filter tubes throughout the entire apparatus and cause a relief of the wall 9 from the process pressure of the press, which rises up to about 6 atmospheres inasmuch as the pressure of the liquid from the chamber 11 also acts on the upper side of the wall 9 carrying the tubes. An outlet pipe 12 at the crest of the dome-shaped cover 8 with a control valve 13 permits raw liquid continuously to return to the storage tank of the raw liquid during the filtration and keep the raw liquid in the cylinder 1 in such motion, that a decomposition of the raw liquid i. e. a separation of the specifically heavier matters in suspension from the lighter does not occur and the formation of the cake takes place in equal mixture of the solid matters along the entire extent of the filter tubes or flasks.

The filter tubes 2 are arranged in parallel rows, for instance five rows I to V, Fig. 3. To each row of the tubes belongs a transverse channel 15 receiving the clear liquid of the filter tubes through outlet holes 14 and discharging it sideways. Between these transverse channels 15 there are situated in the middle of the panel between adjacent tubes the passage openings 10 for part of the raw liquid. Coaxially with the passage openings 10 are located the passage openings 6 of the distributor plate 7 arranged in advance of the filter tubes. All the transverse channels 15 are outside the cylinder 1 connected with a common pipeline 17 equipped with a stop valve 16. Into this collecting pipe 17 opens a compressed air pipe 18 with a stop valve 19.

From the compressed air pipe 18 a branch pipe 18' with stop valve 51 leads to the upper pipe 12 at cover 8 and a branch 18" with stop valve 52 to the bottom pipe 3', 3.

The individual filter tubes 2 consist in known manner of the outer, tubular flasks composed of piled up rings of quadrangular cross section, an inner carrier tube 21 of iron or metal with an abutment collar 22 near its upper end and a cap-shaped closing and tensioning nut 23 at the lower end. The attachment of the filter tubes 2 in the intermediate wall 9 is effected by a cap-shaped nut 20.

In order to impart to the filter tubes the necessary greater strength against the internal pressure, the filter rings are constructed as rigid rings 25, of a stone-like porous material (quartz, infusorial earth, carbide of silicum or the like or a mixture of the mentioned or similar substances) and according to the invention reinforced by thin hide bound annular discs 26 of strong material capable of withstanding high stresses. (Fig. 8).

Thin annular discs 26, of celluloid of a thickness of about 1/64 to 1/16 of an inch have proved efficient as reinforcing means. These discs are dipped into a celluloid solution and in the hot state forced on the faces of the filter rings. Instead of celluloid discs discs of other suitable material, such as vulcanite, bakelite, pertinax may be pressed on to the filtering material, or enamel or atomized metal may be sprayed on the faces, or any other suitable reinforcing materials may be employed, which under the action of heat and pressure are able to penetrate into the pores or interstices of the filtering material and attain binding capacity when cooling down. In case of filtering materials with very minute pores the faces are artificially roughened and provided with small pits into which the reinforcing material strikes roots, so to say.

A further novel feature of the improved filter tubes is, that the supporting or carrier tube 21 has no passage openings for the clear liquid discharged within the reach of the ceramic filtering wall and for the compressed air serving for the cleaning of the filter. The passage of the clear liquid or the reacting compressed air takes place through perforations 30 in a special chamber 29 extending the annular space 28 between the filtering body and the supporting tube in a downward direction, and which consists of metal, vulcanite or another strong substance and is capable of withstanding higher pressures and rushes of compressed air without suffering any distortion. The rushes of compressed air are caught and suppressed by the rigid chamber wall 29 and the direction of flow of the compressed air deflected in the direction of the tubes and thus tangentially to the inner filter face. The upper end of the chamber 29 is centered by short metal sticks 31 mounted on the supporting tube 21.

The filter rings 25 are spaced from the central supporting tube 21 by elastic longitudinal rails 33 of india-rubber or the like, which are inserted into grooved bearings mounted on the supporting tube, see Fig. 7 of the drawings. Between the filter rings 25 or groups of filter rings at a maximum spacing of about 2 inches there are, furthermore, located thin elastic annular discs of klingerite, rubber or the like not shown in the drawings. The resilient arrangement of the filter rings imparts to the filter flasks a certain inherent elasticity and thus ameliorates the stresses to which the filtering material is exposed by lateral oscillations during the flushing of the outside of the filter tubes or flasks.

To enable the thrown off cake substance to be removed from the press at the end of a working period, the bottom 5 of the cylinder or receptacle is pivotally mounted to be swung downwards and provided with a suitable closing device. At an arm 38 at the shell 1 there is pivoted a double-armed lever 39. The inner end of this lever 39 carries movably the bottom 5 of the press, the outer end of the lever a counterweight, not shown in the drawing. The rocking motion of the bottom on the supporting and swinging arms 39 is confined within narrow limits by a transverse rod 40 connecting the arms, which passes with play through an eye 42 of the bottom 5.

The closure of the bottom 5 takes place under co-operation of a packing located in the connecting flanges by a rotatable ring 45, through the bayonet teeth 46 of which the circumferential teeth 47 of the bottom are withdrawn or introduced. The closing pressure of the bottom against the cylinder is set up by wedges 48 at the locking ring, which are moved by four hydraulic press cylinders 49 with double-way pistons through the agency of suitable auxiliary members.

According to my invention the connection of the supply pipe for the raw liquid with the press is such that the opening and closing of hinged bottom 5 of the press cylinder also interrupts or recloses said pipe connection. For this purpose the extreme lower portion of the supply pipe is U-shaped, as shown in Fig. 1 of the drawings, divided at the level of the bottom gap and provided with flanges 43, 44 at the joint, the former being provided with a packing ring placed in a groove, while the latter 44 is fitted with a projecting knife edge pressing against said packing ring. The lower U-shaped portion 3 of the supply pipe is mounted upon the bottom 5 of the press and participates in its movements, and the upper porton 3' of the supply pipe is mounted upon the stationary shell of the press and serves as connecting member for various pipes to be connected with the bottom portion 3 of the supply pipe, such as the pipe 54 with stop valve 55, pipe 56 with stop valve 57, pipe 58 with stop valve 59, pipe 60 with stop valve 61 and pipe 18" with stop valve 52. When closing the press by the bottom plate the necessary pressure at the flange joint 43, 44 is simultaneously produced by the axially acting wedge lock of the bottom.

The mode of operation of the improved filter press is substantially as follows: During the filtering process the stop valve 16 of the discharge pipe 17 for the clear liquid, Fig. 1, is open and the valve 19 for the compressed air closed. The raw liquid in the pressure receptacle or cylinder 1 is filtered at the filter tubes or flasks 2 and escapes as clear liquid through the inner supporting tubes 21, the transverse channels 15, the pipe 17 and the valve 16. Unfiltered raw liquid flows, furthermore, through the top pipe 12 into the storage tank to the extent in which the valve 13 is opened corresponding with its adjustment adapted to the nature of the raw liquid.

When the deposited cake has attained a thickness of about ½ to 1 inch, the raw liquid is first removed from the cylinder 1. For this purpose compressed air is passed into the cylinder 1 from the compressed air pipe 18' through the top pipe 12 and while valve 13 is closed, and this air forces the raw liquid in the cylinder through the pipes 3, 3', 57 back into the storage tank. This compressed air penetrates through the cakes and the porous filter walls also into the filter tubes 2 and forces the clear liquid contained in them through the inner supporting tubes 21, the channels 15 and the clear liquid pipe 17. When passing from the filtration to the draining of the cylinder 1 an overpressure is continuously maintained in the cylinder 1 as long as raw liquid is contained in it to prevent the dropping off of the cake.

As soon as all the liquid is removed from the cylinder 1, the bottom 5 is unlocked and folded down, the valve 16 of the clear liquid pipe 17 closed and the stop valve 19 of the compressed air pipe 18 opened. The compressed air flows through the pipe 17, the transverse conduits 15 and the supporting tubes 21 into the filter flasks 2, passes through the filter walls outwards, detaches the adhering cakes and breaks them up, so that the entire cake mass drops off and out of the press through the opened bottom. The bottom 5 is then swung upward again into the closing position and locked, fresh raw liquid is again admitted through the pipes 55, 3', 3 and the filtration is continued.

If it is desired to lixiviate the cakes adhering to the filter flasks by means of water or any other suitable liquid, the liquid employed is after the displacement of the raw liquid pumped into the cylinder from the pipe 58 through the bottom pipe 3 while preserving an overpressure in the cylinder, and the lixiviation takes place in the same manner as the filtration. After the lixiviation process is finished, the lixiviation liquid, contained in the cylinder 1 is forced back into its storage tank.

To maintain the filter tubes or flasks in good working order it is essential, that they should be cleaned frequently. This is partly effected after each working period by the compressed air entering in the filter tubes in rushes and throwing off the externally adhering cakes. After several working hours takes place furthermore, a washing of the outer faces of the filter tubes lasting from 5 to 10 minutes. For this purpose flushing water is conducted into the press cylinder 1 from a pipe 60 through the bottom pipe 3, 3' and compressed air then blown from the pipe 18" through the bottom pipe 3', 3, while the valve 16 is closed. This air is uniformly distributed over the spaces between the filter tubes by the perforated distributing plate 7, ascends vigorously, sets the flushing water in whirling motion and thoroughly frees the filter tubes from closely adhering substances. Simultaneously compressed air is or may be admitted in rushes or surges from the pipe 18 into the filter tube 2 to eject the particles of sludge seated in the pores or interstices of the filter body, while water is present externally. The air escapes outside at atmospheric pressure through the bores 10 of the upper intermediate partition wall and the top pipe 12.

Although I have described a preferred embodiment of my invention only, it will be readily understood, that various changes and modifications may be made without departing from the spirit and scope of my invention, and I desire, therefore, that only such limitations shall be placed thereon as are imposed by the prior art.

I claim as my invention:

1. In a filter press, in combination, an upright cylinder, a partition wall located below the cover of said cylinder, a plurality of filter flasks suspended from said wall, transverse channels in said wall for the discharge of the clear liquid, bores in said wall for the passage of part of the raw liquid returning to the storage tank and means for centrally introducing the raw liquid at the bottom and returning it into the storage tank at the top of said cylinder.

2. In a filter press, in combination, an upright cylinder, transverse channels formed by parallel connecting ribs of a double wall located below the cover of said cylinder, a plurality of filter flasks arranged in parallel rows opening into said transverse channels, a common discharge pipe for the clear liquid provided with a branch for the admission of compressed air in communication with said transverse channels, axial bores in said double wall for the passage of a part of the raw liquid, and means for centrally introducing the raw liquid at the bottom and returning part into the storage tank at the top of said cylinder.

3. In a filter press, in combination, an upright cylinder, a partition wall located below the cover of said cylinder, a plurality of filter flasks suspended from said wall, transverse channels in said wall for the discharge of the clear liquid, bores in said wall for the passage of part of the raw liquid returning to the storage tank, a tapering bottom at said cylinder, a transverse plate at the widest part of said bottom and provided with bores located between said flasks and coaxial with the bores in said partition wall at the top, and means for centrally introducing the raw liquid at the bottom and returning part into the storage tank at the top of said cylinder.

4. In a filter press, in combination, an upright cylinder, a partition wall located below the cover of said cylinder, a plurality of filter flasks suspended from said wall, transverse channels in said wall for the discharge of the clear liquid, bores in said wall for the passage of part of the raw liquid returning to the storage tank, a pipe for introducing the raw liquid at the bottom, a pipe at the top for returning the raw liquid into the storage tank, and a valve in said pipe at the top adapted to control the passage of the raw liquid through the cylinder in such a manner that the solid matter suspended in the raw liquid cannot settle out.

5. In a filter press, in combination, an upright cylinder, a partition wall located below the cover of said cylinder, a plurality of filter flasks suspended from said wall, transverse channels in said wall for the discharge of the clear liquid, bores in said wall for the passage of part of the raw liquid returning to the storage tank, a central pipe at the bottom of said cylinder capable to be jointed with branch pipes for introducing raw liquid, emptying raw liquid, lixiviating liquid, washing liquid and compressed air, said air pipe cooperating with the washing liquid for setting it in the cylinder in whirling motion and means at the top of said cylinder for returning the raw liquid into the storage tank.

6. In a filter press, in combination, an upright cylinder, a partition wall located below the cover of said cylinder, a plurality of filter flasks suspended from said wall, transverse channels in said wall for the discharge of clear liquid, bores in said wall for the passage of part of the raw liquid returning to the storage tank, and means for centrally introducing the raw liquid at the bottom, means of supplying compressed air through the top pipe to the outer surface of the filter cakes when passing from the filtration to the lixiviation or drying of the cakes to prevent the pressure from dropping to zero, and means at the top of said cylinder for returning part of the raw liquid into the storage tank.

7. In a filter press of the class described, filter flasks consisting of an outer shell of porous material with a supporting prolongating casing of strong materials, and an inner supporting tube having passage openings only within the strong casing.

8. In a filter press of the class described, filter flasks consisting of an outer porous shell and an inner supporting tube, said shell consisting of superposed filtering rings of porous material reinforced by thin hidebound celluloid discs on its plane faces.

In testimony whereof, I have signed my name to this specification, at Leipzig, Germany, this 13th day of November, 1928.

HANS JUNG.